US007120232B2

(12) United States Patent
Naidoo et al.

(10) Patent No.: US 7,120,232 B2
(45) Date of Patent: ＊Oct. 10, 2006

(54) LIFESTYLE MULTIMEDIA SECURITY SYSTEM

(75) Inventors: Surendra N. Naidoo, Austin, TX (US); William P. Glasgow, Austin, TX (US); Gregory E. Feldkamp, Southlake, TX (US)

(73) Assignee: @Security Broadband Corp., Austin, TX (US)

( * ) Notice: Subject to any disclaimer, the term of this patent is extended or adjusted under 35 U.S.C. 154(b) by 192 days.

This patent is subject to a terminal disclaimer.

(21) Appl. No.: 10/607,785

(22) Filed: Jun. 26, 2003

(65) Prior Publication Data

US 2004/0086089 A1   May 6, 2004

Related U.S. Application Data

(62) Division of application No. 10/061,959, filed on Feb. 1, 2002, now Pat. No. 6,658,091.

(51) Int. Cl.
*H04M 11/04* (2006.01)

(52) U.S. Cl. .............................. 379/37; 379/42; 379/45

(58) Field of Classification Search .. 348/14.01–14.09; 379/37–51, 93.02, 93.03; 345/143, 152, 345/154; 340/541, 539, 506; 713/172, 168, 713/201

See application file for complete search history.

(56) References Cited

U.S. PATENT DOCUMENTS

| 4,591,834 | A | 5/1986 | Kyle | 340/566 |
|---|---|---|---|---|
| 4,918,717 | A | 4/1990 | Bissonnette et al. | 379/40 |
| 5,164,703 | A | 11/1992 | Rickman | 340/515 |
| 5,164,979 | A | 11/1992 | Choi | 379/40 |
| 5,280,527 | A | 1/1994 | Gullaman et al. | 380/23 |
| 5,283,816 | A | 2/1994 | Gomez Diaz | 379/40 |
| 5,400,011 | A | 3/1995 | Sutton | 340/566 |
| 5,406,260 | A | 4/1995 | Cummings et al. | 340/568 |
| 5,412,708 | A * | 5/1995 | Katz | 348/14.05 |
| 5,414,409 | A | 5/1995 | Voosen et al. | 340/541 |
| 5,414,833 | A | 5/1995 | Hershey et al. | 395/575 |
| 5,448,290 | A | 9/1995 | VanZeeland | 348/153 |
| 5,452,344 | A | 9/1995 | Larson | 379/107 |
| 5,510,975 | A | 4/1996 | Ziegler, Jr. | 364/148 |
| RE35,268 | E | 6/1996 | Frolov et al. | 340/545 |

(Continued)

FOREIGN PATENT DOCUMENTS

BE   1008939   10/1996

(Continued)

OTHER PUBLICATIONS

GrayElectronics, http://www.grayelectronics.com/default.htm.

(Continued)

*Primary Examiner*—Melur Ramakrishnaiah
(74) *Attorney, Agent, or Firm*—Conley Rose, P.C.

(57) ABSTRACT

A method for remote monitoring of a premises. A geographically remote client is operatively coupled to a security system server capable of authenticating a user of the remote client. The remote client is then operably coupled to a security gateway capable of managing the monitoring of the premises, activating a signal at the premises for notifying an occupant at the premises that remote monitoring is occurring, and transferring information between the security gateway and the remote client. The transfer of information between the security gateway and the remote client is controlled by the user of the remote client. The security gateway may be operably coupled to at last one camera at the premises and to at least one audio station at the premises.

20 Claims, 5 Drawing Sheets

U.S. PATENT DOCUMENTS

| | | | | |
|---|---|---|---|---|
| 5,525,966 | A | 6/1996 | Parish | 340/568 |
| 5,526,428 | A | 6/1996 | Arnold | 380/25 |
| 5,534,845 | A | 7/1996 | Issa et al. | 340/425.5 |
| 5,541,585 | A | 7/1996 | Duhame et al. | 340/825.69 |
| 5,543,778 | A | 8/1996 | Stouffer | 340/539 |
| 5,546,447 | A | 8/1996 | Sakarbo et al. | 379/142.01 |
| 5,550,984 | A | 8/1996 | Gelb | 395/200.17 |
| 5,557,254 | A | 9/1996 | Johnson et al. | 340/426 |
| 5,570,079 | A | 10/1996 | Dockery | 340/541 |
| 5,572,438 | A | 11/1996 | Ehlers et al. | 364/492 |
| 5,602,918 | A | 2/1997 | Chen et al. | 380/21 |
| 5,604,493 | A | 2/1997 | Behlke | 341/22 |
| 5,606,615 | A | 2/1997 | Lapointe et al. | 380/25 |
| 5,621,662 | A | 4/1997 | Humphries et al. | 364/550 |
| 5,629,687 | A | 5/1997 | Sutton et al. | 340/825.37 |
| 5,631,630 | A | 5/1997 | McSweeney | 340/522 |
| 5,638,046 | A | 6/1997 | Malinowski | 340/539 |
| 5,652,567 | A | 7/1997 | Traxler | 340/552 |
| 5,675,321 | A | 10/1997 | McBride | 340/568 |
| 5,680,131 | A | 10/1997 | Utz | 341/176 |
| 5,682,133 | A | 10/1997 | Johnson et al. | 340/426 |
| 5,686,885 | A | 11/1997 | Bergman | 340/514 |
| 5,689,235 | A | 11/1997 | Sugimoto et al. | 340/541 |
| 5,689,708 | A | 11/1997 | Regnier et al. | 395/682 |
| 5,691,697 | A | 11/1997 | Carvalho et al. | 340/544 |
| 5,694,595 | A | 12/1997 | Jacobs et al. | 395/609 |
| 5,696,486 | A | 12/1997 | Poliquin et al. | 340/506 |
| 5,696,898 | A | 12/1997 | Baker et al. | 395/187.01 |
| 5,706,191 | A | 1/1998 | Bassett et al. | 364/138 |
| 5,712,679 | A | 1/1998 | Coles | 348/158 |
| 5,714,933 | A | 2/1998 | Le Van Suu | 340/568 |
| 5,717,378 | A | 2/1998 | Malvaso et al. | 340/506 |
| 5,719,551 | A | 2/1998 | Flick | 340/426 |
| 5,726,912 | A | 3/1998 | Krall, Jr. et al. | 364/550 |
| 5,736,927 | A | 4/1998 | Stebbins et al. | 340/506 |
| 5,737,391 | A | 4/1998 | Dame et al. | 379/37 |
| 5,748,084 | A | 5/1998 | Isikoff | 340/568 |
| 5,748,089 | A | 5/1998 | Sizemore | 340/574 |
| 5,757,616 | A | 5/1998 | May et al. | 361/683 |
| 5,761,206 | A | 6/1998 | Kackman | 370/476 |
| 5,774,051 | A | 6/1998 | Kostusiak | 340/539 |
| 5,784,461 | A | 7/1998 | Shaffer et al. | 380/21 |
| 5,784,463 | A | 7/1998 | Chen et al. | 380/21 |
| 5,793,028 | A | 8/1998 | Wagener et al. | 235/380 |
| 5,793,763 | A | 8/1998 | Mayes et al. | 370/389 |
| 5,801,618 | A | 9/1998 | Jenkins | 340/426 |
| 5,805,056 | A | 9/1998 | Mueller et al. | 340/426 |
| 5,805,064 | A | 9/1998 | Yorkey | 340/539 |
| 5,809,013 | A | 9/1998 | Kackman | 370/253 |
| 5,812,054 | A | 9/1998 | Cohen | 340/506 |
| 5,845,070 | A | 12/1998 | Ikudome | 395/187.01 |
| 5,854,588 | A | 12/1998 | Dockery | 340/541 |
| 5,859,966 | A | 1/1999 | Hayman et al. | 395/186 |
| 5,861,804 | A | 1/1999 | Fansa et al. | 340/539 |
| 5,867,484 | A | 2/1999 | Shaunfield | 370/254 |
| 5,877,696 | A | 3/1999 | Powell | 340/825.32 |
| 5,881,226 | A | 3/1999 | Veneklase | 395/188.01 |
| 5,892,442 | A | 4/1999 | Ozery | 340/539 |
| 5,898,831 | A | 4/1999 | Hall et al. | 395/187.01 |
| 5,926,209 | A | 7/1999 | Glatt | 348/143 |
| 6,002,430 | A | 12/1999 | McCall et al. | 348/207 |
| 6,069,655 | A | 5/2000 | Seeley et al. | |
| 6,091,771 | A | 7/2000 | Seeley et al. | 375/154 |
| 6,097,429 | A | 8/2000 | Seeley et al. | 348/154 |
| 6,108,034 | A | 8/2000 | Kim | 348/154 |
| 6,161,182 | A * | 12/2000 | Nadooshan | 713/172 |
| 6,226,031 | B1 | 5/2001 | Barraclough et al. | 348/14.13 |
| 6,275,227 | B1 * | 8/2001 | DeStefano | 369/30.01 |
| 6,314,425 | B1 * | 11/2001 | Serbinis et al. | 707/10 |

FOREIGN PATENT DOCUMENTS

| | | |
|---|---|---|
| CA | 2203813 | 6/1996 |
| CA | 2174482 | 10/1997 |
| GB | 2286423 | 8/1995 |
| GB | 2291554 | 1/1996 |
| GB | 2320644 | 6/1998 |
| GB | 2325548 | 11/1998 |
| GB | 2325548 A | 11/1998 |
| JP | 363033088 A | 2/1988 |
| JP | 405167712 A | 7/1993 |
| JP | 6339183 | 12/1994 |
| JP | 410004451 A | 1/1998 |
| JP | 02000023146 A | 1/2000 |
| JP | 020001006343 A | 1/2001 |
| JP | 02001069209 A | 3/2001 |
| TW | 340934 | 9/1998 |
| WO | WO 89/11187 | 11/1989 |
| WO | WO 95/13944 | 5/1995 |
| WO | WO 97/13230 | 4/1997 |
| WO | WO 98/25243 | 6/1998 |
| WO | WO 98/52343 | 11/1998 |
| WO | WO 98/59256 | 12/1998 |
| WO | WO 02/11444 | 2/2002 |

OTHER PUBLICATIONS visitalk.com—communication with vision, http://www.visitalk.com.
Genex OmniEye, http://www.genextech.com/prod01.htm.
Elwahab et al.; Device, System and . . . Customer Premises Gateways; Sep. 27, 2001; WO 01/71489.

* cited by examiner

LIFESTYLE MULTIMEDIA SECURITY SYSTEM

This is a divisional application of U.S. patent application Ser. No. 10/061,959, filed Feb. 1, 2002 now U.S. Pat. No. 6,658,091, and hereby incorporated by reference as if reproduced in its entirety.

BACKGROUND OF THE INVENTION

1. Field of the Invention

The present invention relates generally to the field of security systems. More particularly, the present invention relates to a system and method for the remote monitoring of a premises from a location other than the premises.

2. Description of Related Art

Conventional security systems typically protect a building using make/break contacts strategically placed at doors, windows, and other potential entry points and motion sensors in strategic areas inside the building. Other devices include glass breakage detectors, panic or medical alert buttons, temperature and flood sensors, smoke detectors, and P.I.R. (passive infra red) sensors, a type of motion sensor that senses heat differences caused by animate objects such as humans or animals. Also used are vibration sensors which, when placed upon a window for example, detect when the window is broken, and radio frequency (rf), radar, and microwave sensors, as well as laser sensing. When the system is on and a sensor is tripped, a signal is sent through a wire, or using radio frequencies (on wireless systems), to a main controller which sounds a siren and dials out via telephone, an IP connection, or cellular service to the monitoring station whenever an alarm condition occurs.

One technological approach to determining whether or not an alarm condition exists is through the use of separate audio monitors operating in concert with separate alarm sensors. U.S. Pat. Nos. 4,591,834 and 4,918,717 are directed to such systems. For example, U.S. Pat. No. 4,591,834 refers to the use of miniature, low-frequency dynamic microphones. Alarm activities noted at the microphones are verified via a separate network of discriminator sensors which comprise geophones. Signal processing techniques are utilized to distinguish alarm activity. Intrusion and discriminator sensors are arranged in known patterns comprised of multiple sensors of each type. U.S. Pat. No. 4,918,717 refers to a system wherein a number of microphones are distributed about a secured premises in relation to other intrusion sensors. Upon detection of an intrusion alarm, the microphones can be manually enabled one at a time from the central station to allow an operator to listen to audio activity in proximity to the sensor alarm.

Another approach is the use of video images to monitor a location. In many prior art devices, however, the video images may not be received by the monitoring party until several moments have passed after the recorded event has actually taken place, likely causing any response to be late and less effective.

Another disadvantage with existing security systems is that after a person has left the premises, he or she may not be certain that he or she remembered to activate or arm the security system. In prior art systems, it has been necessary to return to the premises to arm the security system or ask someone else to check on the premises and report back to the person. Returning to the premises is time-consuming and inconvenient, and may not be possible if the person is traveling or is otherwise unable to return to the premises.

In addition, the owner of a premises may desire to monitor the premises or communicate with an occupant of the premises, whether or not an alarm has been triggered. One approach for remote monitoring or remote communication involves the use of web cams. A disadvantage to using web cams is that they fail to address privacy concerns by failing to inform or notify the occupant of the premises that remote surveillance is occurring. Instead, the attraction of web cams to consumers is the ability to spy on a location without individuals knowing the web cam is transmitting images of the premises.

Furthermore, the owner of the premises may desire to modify aspects of the security system while he or she is away from the premises. In many prior art systems, the owner is unable to modify certain aspects of the security system. Instead, the security system must be reconfigured by a representative of the security system manufacturer or a complex process using the keypad with limited user interface. It is therefore desirable for a user at a remote location to be capable of arming and disarming the security system, changing aspects of the security system, and generally having access to control the monitoring of the premises from the remote location.

Prior art systems generally do not provide for two-way audio communication. Two-way audio capabilities enable owners of the premises and monitoring personnel to communicate with individuals present at the premises, providing an extra means for determining the status of the premises (such as determining if an alarm event is actually occurring) and, in the case of a remote user communicating with the premises, the opportunity to maintain a sense of control of the premises (such as communicating with a child at the premises).

Prior art systems generally do not provide for hands-free communication by occupants of the premises with a remote user. In cases in which the occurrence of an alarm event has resulted in an occupant being injured or otherwise unable to operate the security system, the only option was to wait for someone to check on the premises and notify the proper authorities. Furthermore, prior art systems generally do not transmit images or sound during non-alarm periods. It is therefore desirable to provide a security system capable of transmitting images and sound during non-alarm time periods, and to further provide a way for individuals at a monitored location to communicate with users accessing the security system from a remote location, and without the need for acknowledging the remote user in order to communicate.

There is a desire to balance security, privacy, and convenience concerns, particularly with residential security systems. Many prior art security systems sacrifice security and lack convenience for the sake of privacy. It is therefore desirable to provide a security system that provides security of the premises, is configurable to address privacy concerns of the occupants, and is convenient for the users of the security system to access the system remotely.

SUMMARY OF THE INVENTION

From the foregoing, it can be appreciated that a need has arisen for a security system and method that overcomes the limitations of the prior art. It is desirable that such a security system provide the convenience of remote monitoring of a premises by a remote user, while simultaneously addressing privacy concerns by providing a notification signal to alert occupants of the premises that remote monitoring is occurring. It is further desirable that such a system use available infrastructure and protocols and overcome the limitations of conventional methods.

Accordingly, the present invention provides a method for remote monitoring of a premises, comprising the steps of operatively coupling a geographically remote client to a security system server which is capable of authenticating a user of the remote client, operatively coupling the remote client to a security gateway which is capable of managing the monitoring of the premises, activating a signal at the premises for notifying an occupant at the premises that remote monitoring is occurring, and transferring information between the security gateway and the remote client. The transfer of information between the security gateway and the remote client is controlled by the user of the remote client. The security gateway may be operably coupled to at least one camera and to at least one audio station.

The notification signal may comprise an audible signal or a visible signal or both. An audible notification signal may comprise a sound uniquely associated with the remote user, and can comprise speech, which may identify the remote user. A visible notification signal may comprise a depiction of the remote user, or a graphical image, or an alphanumeric message, which may identify the remote user, and which may be transmitted to a keypad at the premises. The visible notification signal may be transmitted to a display device, such as a television. The visible notification signal may further comprise an activation signal for a light source at the premises, such as a light emitting diode (LED). The LED may be located on a camera or on a keypad, for example.

In accordance with one embodiment, the inventive method may further comprise steps for verifying the identification of the remote user, transmitting an access token from the security system server to the remote client, providing the security gateway with information about the remote user and the access token and disabling communication between the security system server and the remote client. The access token may be adapted to allow the remote client to access the security gateway based on the user's permission profile, which is created by a General Administrator of the security gateway. The access token may expire at a designated time and date, or after a designated length of time has elapsed, or after a designated number of accesses has occurred, or upon access being removed by a General Administrator. The access token may allow access to specific features of the security gateway in accordance with the user's permission profile.

In another embodiment, the inventive method may further provide a controller capable of performing one or more building automation control functions, which may include without limitation controlling air conditioning systems at the premises, doors at the premises, lighting devices at the premises, irrigation systems at the premises, or electrical appliances at the premises.

In yet another embodiment, the inventive method may provide for streaming data in substantially real-time from the security gateway to the remote client. In still another embodiment, the inventive method may provide for substantially real-time audio communication or video communication, or both, between the remote client and the security gateway.

The inventive method may also provide for continuously caching audio and video data. Furthermore, the method of the present invention may provide for recording audio and video data during a particular time period. The particular time period may comprise intervals according to a predetermined schedule, or may be determined upon demand of an administrator of said security gateway. The particular time period may begin prior to triggering of an alarm, or prior to triggering of a sensor.

The present invention further provides a system for remote monitoring of a premises by a geographically remote user, comprising a security system server capable of authenticating the user, a security gateway capable of managing the monitoring of the premises, one or more cameras, and one or more audio stations, wherein the security gateway provides an audiovisual signal at the premises for notifying an occupant at the premises that remote monitoring is occurring. The inventive system may further comprise a controller capable of performing building automation control functions. The system may also provide for streaming data in substantially real-time from said security gateway to said remote client. The system may further provide for substantially real-time synchronized audio and video communication between said remote client and said security gateway.

The present invention can be also used in many different vertical segments within the security industry. In this present invention, the audio and video digitization and processing including compression is centralized at the security gateway. As processors become less expensive and more efficient, these functions can be done at the individual camera or at the audio station. The security gateway may then act as a central communications and controller for the cameras, audio stations and various other sensors.

The present invention provides the advantage of using the security system as a platform for two-way audio and video communication. By making communication between a remote user and the premises very convenient, the present invention allows the owner of the premises to be proactive in monitoring the premises by allowing remote viewing as well as communicating with individuals at the premises.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

It is to be noted, however, that the appended drawings illustrate only exemplary embodiments of the invention and are therefore not to be considered limiting of its scope, for the invention may admit to other equally effective embodiments. In addition, although the figures may depict embodiments wherein each of the components represent different devices or locations, they can be combined into a single device or location. In addition, a single component may be comprised of a combination of components.

DETAILED DESCRIPTION OF THE INVENTION

Figure 1:
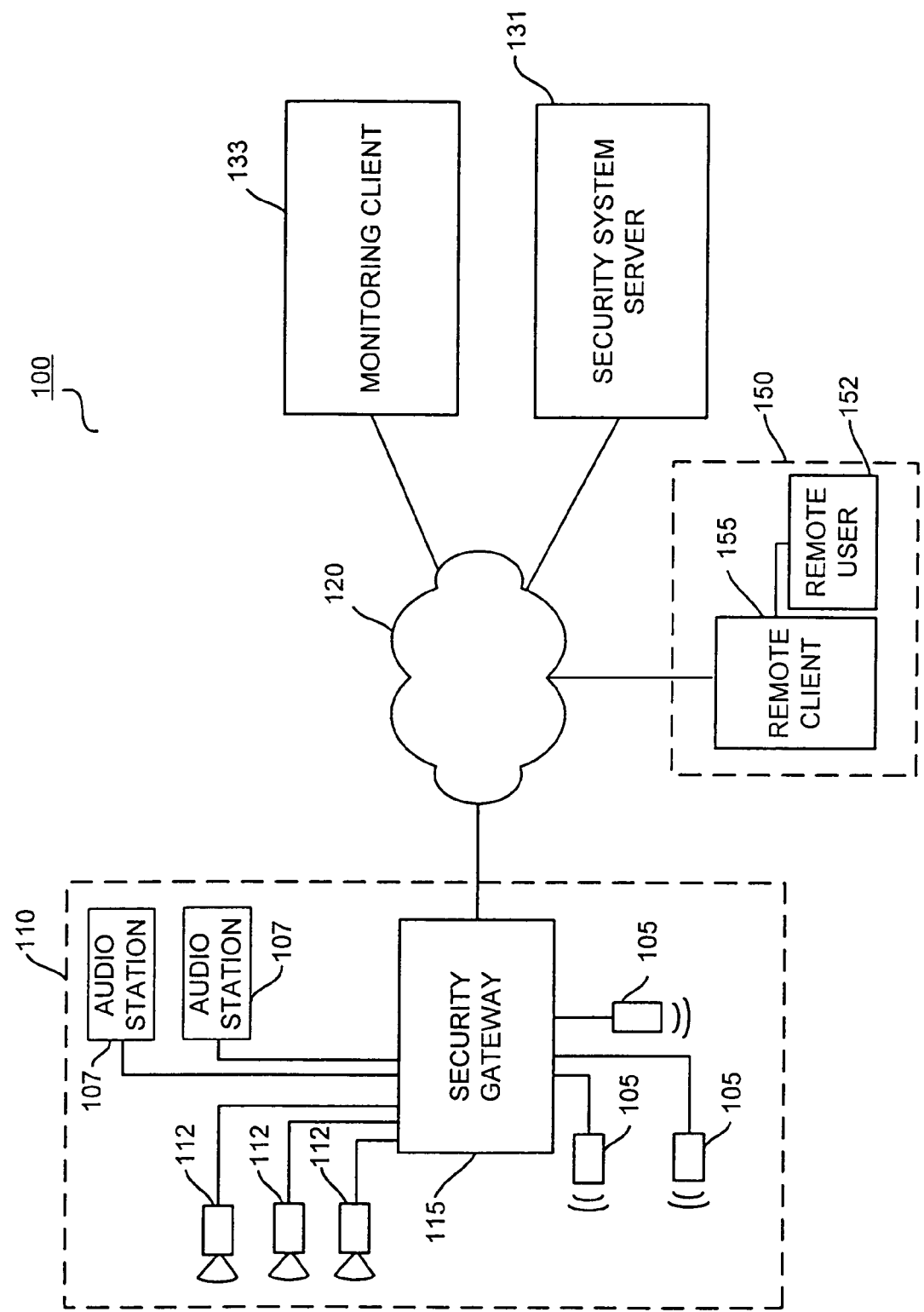
FIG. 1 is a block diagram of a security system according to one embodiment of the disclosed system and method.

The present invention addresses several shortcomings of the prior art by providing a security system and framework that is configured to deliver real-time information, including audiovisual information about alarm conditions and/or personal conditions to remote users. As a further advantage, the framework may be easily adapted for use in other applications that incorporate real-time information and video delivery.

The term "security system" is used in this document to mean a system for monitoring a premises, e.g., for the purpose of discouraging and responding to burglaries, fires, and other emergency situations. Such a security system is well-suited for residential homes, but may also find use with schools, nursing homes, hospitals, businesses or any other location in which real-time information may be useful in obtaining adequate response upon the occurrence of alarm conditions. By integrating broadband features, including audiovisual capabilities, web access and wireless capabilities, and video and voice over IP protocols, embodiments of the present invention provide audiovisual alarm verification, 24-hour monitoring capabilities, and a secure web site with remote access features and security-focused content.

The term "lifestyle monitoring" is used in this document to mean audiovisual monitoring and communicating on demand during non-alarm situations. The term "audiovisual" is used in this document to mean audio or video or both. An example of a non-alarm situation is when a parent checks on latch-key children or a caregiver checks on an elderly person. Embodiments of the present invention may be used to give peace of mind to the owner of the premises while he or she is away from the premises. Embodiments of the present invention may also be used to proactively respond to situations before they become emergencies.

The term "remote user" is used in this document to mean any individual located at any location other than the premises or the central monitoring station. A remote user may include the owner of the premises, when the owner is not physically located at the premises. A remote user may also include a guest user, such as an individual whom the owner has given permission to access certain aspects of the security system. Because monitoring personnel at a central monitoring station do not have access to the security system except during alarm events, they are not considered remote users as they are described in this document.

For purposes of the present invention, the term "premises" refers to real property, including one or more structures thereupon and their surroundings. For the purposes of the present invention, a premises preferably comprises a residential housing, but it will be appreciated by one skilled in the art that a premises may also comprise commercial facilities, educational facilities, and the like.

Further, the term "a" is generally used in the present disclosure to mean one or more. Still further, the terms "coupled" and "operatively coupled" mean connected in such a way that data may be transmitted or received. It is understood that "coupled" and "operatively coupled" do not require a direct connection, a wired connection, or even a permanent connection. It is sufficient for purposes of the present invention that the connection(s) be established for transmitting and receiving information.

In the present disclosure, the term "high-speed" or "high-bandwidth" generally means capable of providing sufficient bandwidth for data to be transmitted in real-time, i.e., with substantially no latency. In one embodiment, high-speed connections are those capable of transmitting at speeds of at least 128 Kbps. High-speed connections include but are not limited to cable modem connections, xDSL connections, and high-speed wireless connection.

The term "non-alarm event" is used in this document to describe an event that occurs at the premises which does not constitute an alarm event. A non-alarm event is designated by the triggering of a sensor. For example, a motion sensor located near the front door may detect the presence of a person approaching the front door. This person may be, for example, a delivery person dropping off a package for the resident and would not constitute an alarm event. This non-alarm event, however, may be used by the owner of the premises to analyze the security system effectiveness (such as determining the capability of the front door camera to capture images in case of an alarm event), for lifestyle purposes (such as how often people approach the front door), or to provide monitoring personnel with a general time frame associated with an alarm event.

The term "remote client" is used in this document to mean any processor-based device capable of connecting to a network. For example, a remote client may comprise a personal computer, a PDA, or a mobile phone.

Referring now to the drawings, FIG. 1 depicts a block diagram of an exemplary security system 100 according to one embodiment of the present invention. Security system 100 comprises a security gateway 115, which is typically located, but is not required to be located, at premises 110. Security system 100 further comprises a monitoring client 133 operatively coupled to security gateway 115 through a network 120. Security system 100 further comprises a security system server 131 operatively coupled to security gateway 115 through network 120.

In general, network 120 may be a public network or private network, a single network or a combination of several networks. In most embodiments, network 120 may be, but is not required to be, an IP-based network. In some embodiments it may be desirable for all or a portion of network 120 to include publicly available networks, such as the Internet, to avoid the need for installing, purchasing, or leasing additional infrastructure. However, in some systems, e.g., those that use high-bandwidth transmissions, it may be desirable to include dedicated high-bandwidth connections including, without limitation, leased lines, frame relay networks, and ATM networks, within network 120. Further, in some systems it may be desirable to use a network 120 with quality of service guarantees given the real-time nature of the information that is transmitted.

Generally, security gateway 115 is a processor-based device operable to monitor premises 110 by capturing and recording audiovisual information relating to the premises during pre-alarm, and post-alarm-periods, as well as during non-alarm events. Security gateway 115 also detects and relays alarm conditions at premises 110 and captures information relating to such alarm conditions. Upon triggering of an alarm, security gateway 115 sends cached, stored, and live information from pre-event, pre-alarm, and post-alarm segments to security system server 131 for verification and response.

Security gateway 115 may, but is not required to be, located at premises 110. Some or all components of security gateway 115 may be located remotely, but remain operatively coupled to security sensors 105, audio stations 107, and video cameras 112 which are located at premises 110. In accordance with a preferred embodiment of the present invention, premises 110 comprises a building such as a residential home. Advantageously, the present invention provides for sensors 105, audio stations 107 and video cameras 112 to be located indoors as well as outdoors. For example, sensors 105, audio stations 107 and video cameras 112 may be located in certain rooms or zones within the building on premises 110, as well as outside the doors of the building.

Monitoring client 133 generally comprises a software program that may be used to display some or all of the information provided by security gateway 115. Monitoring client 133 may be a stand-alone program or integrated into one or more existing software programs. One or more operators may then use this information to evaluate whether the alarm condition corresponds to an actual alarm condition and then take additional action, if desired, such as alerting the appropriate authorities.

Security system 100 generally includes one or more sensors 105 coupled to security gateway 115 for the purpose of detecting certain events. One skilled in the art will appreciate that security system 100 is not limited to any specific type or model of sensor 105. A variety of sensors 105 may be used, depending on the desired type and level of protection. Examples include, without limitation, magnetic contact switches, audio sensors, infrared sensors, motion detectors, fire alarms, panic buttons, and carbon monoxide sensors. Sensors 105 may be wired directly into an alarm control panel built into security gateway 115, or they may be wirelessly connected. The type of sensors 105 to be used depends on the specific application for which security system 100 is designed. In some embodiments, multiple sensors 105 may be used. In such embodiments, security gateway 115 may consider data from all, some, or one of sensors 105 in the detection of alarm conditions. Additionally, security system 100 can store multiple video events triggered by sensors 105, or at scheduled times.

Security system 100 also includes one or more cameras 112 and audio stations 107 operable to capture video data and audio data, respectively, from premises 110. Cameras 112 may be, but are not required to be, 360-degree cameras or panoramic cameras. Audio stations 107 may include microphones and speakers and are capable of providing two-way communication as well as emitting a signal for alerting occupants of the premises that communication is occurring.

In addition, security gateway 115 may be configured to create an association between one or more sensors 105 and an associated camera 112 or audio station 107. Whether or not separate sensors 105 are present, security gateway 115 may capture video or audio or both from cameras 112 and audio stations 107 to assist in the determination of whether an alarm condition exists and thereby whether to generate and send an alarm signal to the security system server 131. Cameras 112 and audio stations 107 continuously transmit audiovisual data to security gateway 115 for caching (i.e., temporarily storing), recording (i.e., storing for a long term), or streaming to a remote user 152 or security system server 131. In some embodiments, sensors 105, such as motion detectors, infra-red sensors and audio sensors, may be replaced by an intelligent alarm module that is able to detect motion or intrusion by analyzing the video data or audio data or both generated from cameras 112 and audio stations 107.

In some embodiments, the segment of audiovisual data may be compressed using one or more of any number compression techniques known by one of skill in the art. For example, this may involve the use of video compression algorithms such as Motion Pictures Expert Group (MPEG). Further, the resolution or color depth of the video may be reduced to lessen the amount of bandwidth required for transmission. In one embodiment, alarm video can be transmitted at least 3 frames per second. In addition, the alarm video may have an end resolution (i.e., after interpolation and/or image enhancement, etc.) of 320 pixels by 240 pixels or higher, and optionally nay be transmitted in color. It is noted that the present invention is not limited to any particular audio, video, or communications standards. The present invention may incorporate any such standards, including, without limitation: H.323, Adaptive Differential Pulse-Code Modulation (ADPCM), H.263, MPEG, User Datagram Protocol (UDP), and Transmission Control Protocol/Internet Protocol (TCP/IP).

A disadvantage with intrusion systems in the prior art, including video surveillance systems, is that they provide very little or no information leading up to the alarm event. Prior art systems are typically configured to record audiovisual information only after an alarm is triggered. The only information that a monitoring agent typically receives is specific to that information about how an alarm event was defined which usually includes the time, type and location of sensor that was triggered. This limited information does not adequately help the monitoring agent verify the event. Even in video surveillance systems, the monitoring agent typically only views live camera(s) associated with that alarm sensor, which may not be adequate. A typical prior art intrusion system protects the perimeter of a residence or facility, and alarm events are only declared when the perimeter sensors, such as window or door contact switches, or internal sensors, such as motion sensors, are triggered.

The present invention, however, provides for continuous caching of audiovisual data while the security system 100 is armed. Furthermore, if the security system 100 is armed and one of the sensors 105 is triggered, the segment of cached audiovisual data immediately prior to, during, and immediately following the triggering of the sensor 105 is stored in memory, preferably located in the security gateway 115 for privacy reasons, or in another storage device that is operatively coupled to the security gateway 115 via a network. For example, when a particular sensor 105 is triggered, cached audiovisual data from the camera 112 and audio station 107 associated with that sensor 105, beginning several seconds prior to the triggering of the sensor 105 and ending several seconds after the triggering of the sensor 105, may be stored in the memory. In addition, audiovisual data may be also be stored in memory at scheduled times. The General Administrator may view the stored data and may archive it if desired. If the system alarm is triggered, then the monitoring client 133 may access the stored data. The length and number of stored segments can be adjusted depending upon the capacity of the memory.

Furthermore, information from cameras 112 that are placed outside the facility of premises 110 is used in the verification of alarms. For example, in one implementation, a front door camera records "events" for a fixed duration of time, such as ten seconds. The events are defined by a motion sensor being triggered. In one implementation, the security gateway stores approximately twenty of these non-alarm events. However, this event is not an alarm event but a non-alarm event. If the alarm system is triggered, the monitoring agent can in substantially real time access the various non-alarm audiovisual events. The non-alarm information is used by the monitoring agent to provide contextual information surrounding an actual alarm event.

An advantage of continuously caching audiovisual data and storing the cached data before and after a particular sensor 105 is triggered, even though an alarm has not been triggered, is allowing the ability to capture important information leading up to an intrusion or other alarm event. The stored data can provide context to audiovisual data surrounding the triggering of an alarm and can thus be used to verify whether an alarm is an actual emergency situation or a false alarm. For example, a potential intruder may walk around the premises 110 prior to breaking in, in order to look for a point of entry. The cached data surrounding the triggering of the sensors 105 provide the monitoring client 133, and ultimately law enforcement, with more information about the intruder than may be available if the camera 112 only began recording after the alarm was triggered. A monitoring agent reviewing this information, within minutes of the alarm triggering, will be able to review the stored non-alarm audiovisual events and make a verification decision. For example, if the non-alarm information includes several events illustrating strange behavior by someone that does not look like the owner or occupant or authorized guest of premises 110, this is likely to be an actual alarm event. Non-alarm information is recorded even when the intruder is leaving the premises 110. For example, a front door camera may record the intruder leaving the premises 110 and getting into his getaway car, further providing evidence for verification and possibly prosecution. In all recorded events, both non-alarm and alarm, the security gateway 115 records a segment of audiovisual information prior to a sensor 105 being triggered. In one implementation, the length of this pre-event recording is five seconds. It will be appreciated by those of skill in the art that the length of recording may be customized in accordance with the requirements and specifications of the particular security gateway 115 and the preferences of the owner of the premises 110. This function is enabled by the continuous caching of pre-event information in the security gateway 115.

A further advantage to continuously caching audiovisual data and storing the cached data before and after a particular sensor 105 is triggered is the added convenience and peace of mind of the owner of the premises. For example, the owner of the premises 110 may view the stored data remotely in order to verify whether a false alarm has occurred, or to check to see if the owner's child has come home from school safely.

The present invention provides for access to security gateway 115 and security system server 131 by remote user 152 using a remote client 155 which is located at a remote location 150. Remote user 152 may be the General Administrator, i.e., a person (typically the owner of premises 110) having full access to security gateway 115, including without limitation having the following capabilities: accessing all zones; arming and disarming security system 100; reviewing logs of alarm events and non-alarm events; accessing account information such as the billing address, phone number, and contact persons; renaming a sensor; performing maintenance on the system such as checking battery levels; creating guest accounts for other remote users 152, including defining access permissions for the guest user and creating a username and password for the guest user; and adjusting controls on the security system 100, such as the gain control for the microphones, the volume controls for the speakers, and the time limit for caching information. Alternatively, remote user 152 may be a guest user, i.e., a user whose permissions and access are controlled by the General Administrator. The features of the security system that a guest user may access are defined and modified according to the General Administrator's preferences. Additional information regarding general system administrative functions and user permissions can be found in U.S. Pat. Nos. 5,689,708; 5,694,595; and 5,696,898, the contents of which are incorporated by reference herein.

Remote client 155 is operatively coupled to security gateway 115 and security system server 131. Remote user 152 is authenticated by security system server 131. In a preferred embodiment, remote users 152 are identified by a user name and password. It will be appreciated by those skilled in the art, however, that the present invention contemplates the use of many authentication techniques, including without limitation, physical possession of a key, user name and password, smartcards, and biometrics. For example, the system could recognize the remote user's 152 facial features, signature, voice or fingerprint and disarm the system without a Personal Identification Number (PIN) code. Additional information regarding the use of biometrics may be found in U.S. Pat. No. 5,526,428, the contents of which are incorporated herein by reference.

Remote client 155 may connect to security system server 131 and security gateway 115 (after authentication) via network 120. In one particular embodiment, remote client 155 includes a web-browser-based video client for accessing audio and video data. Typically, the web-based video client is a web browser or a plug-in for a web browser. After authentication, security system server 131 may be configured to create a data connection between remote client 155 and security gateway 115 such that communications between remote client 155 and security gateway 115 bypass security system server 131. Advantageously, this avoids network bottlenecks at the security system server 131, particularly when transmitting large amounts of data such as during the transmission of streaming audiovisual data.

In one embodiment, once authenticated, remote user 152 may perform lifestyle monitoring from remote location 150 through security gateway 115. The remote monitoring feature allows remote user 152 at remote location 150 to view all or only selected portions of the video images from video cameras 112, and to hear all or only selected portions of audio data from audio stations 107. Depending on the access permissions assigned to remote user 152, remote user 152 may further have the capability to accomplish the following: arm and disarm the system 100; configure the security system 100 to monitor different zones; review and change account information; and participate in lifestyle communications with occupants at premises 110. In addition, remote user 152 may be able to configure the quality of the audiovisual data for remote monitoring. Depending on the bandwidth of the connection, the information transmitted to remote client 155 may be of a lower quality than that transmitted to security system server 131 for verification of alarm signals. For example, in one embodiment, the video transmitted to remote client 155 may have a lower frame rate, lower resolution, and/or lower color depth.

Security gateway 115 may be configured to limit the transmission of all data (heartbeat, control, video, and audio) to a configurable ceiling relating to the remote client 155 access. Advantageously, this may provide the necessary amount of bandwidth to deliver the requested services, but prevents one user from creating a network bottleneck by requesting too much data at once. In one embodiment, a 128 kbps transmission ceiling is imposed. Access by web based client 155 to security gateway 115 may be preempted whenever an alarm condition occurs so that monitoring personnel have full control over cameras 112 and audio stations 107 to respond to the alarm condition.

The present invention also provides for lifestyle monitoring by a guest user. Access permission for each remote user 152 is defined by the General Administrator. Access may be limited to certain time intervals (such as only at certain times during the day), a certain interval of time (such as beginning Friday and ending Sunday), or for a certain number of times (such as three times a day or three times with no expiration date). Access may also be limited to certain cameras 112 or audio stations 107, etc.

When a guest user performs lifestyle monitoring, the guest user will have limited access to security system 100. Thus, guest users may not have full access to all cameras 112 and all audio stations 107 at all times. For example, remote user 152 may be able to access video from a camera 112 in a kitchen twenty-four hours a day, but may never be able to monitor audio or video from a bedroom. As another example, remote user 152 may be given permission to view video from several cameras 112 on a particular day, but only on that particular day. Remote user 152 may also be given permission to only access certain audio stations 107.

Although remote users 152 may be given unlimited access to a part or all of the security system 100, such access does not necessarily give the remote users 152 the capability or authorization to change the security settings. Therefore, remote user 152 can access at least a portion of security system 100 without accidentally or intentionally disarming parts or all of the system. Furthermore, remote user's 152 access privileges to security system 100 may be withdrawn or rescinded at any time by the General Administrator.

An advantage to allowing remote user 152 to access certain cameras 112 and audio stations 107 is that a lifestyle communication between the remote user 152 and one or more occupants of premises 110 can take place without requiring the occupants to do anything to acknowledge remote user 152 and start a communication session. Unlike prior art video telephony systems, the system in accordance with the present invention is particularly advantageous in situations in which an occupant at premises 110 is unable to physically respond, for example, a person with certain disabilities. Such a system is further advantageous in other settings in which a person at premises 110 is unwilling to participate in lifestyle communication, such as an unruly child. Thus, the present invention provides for lifestyle communication without requiring an occupant of the premises 110 to walk to a keypad or other device to acknowledge remote user 152 and start a communication session.

In one embodiment of the present invention, security gateway 115 may comprise a controller capable of performing one or more building automation control functions. Such functions may include without limitation controlling air conditioning systems, doors, lighting devices, irrigation systems, and electrical appliances at the premises. Building and home automation is described in more detail in U.S. Pat. Nos. 5,510,975; 5,572,438; 5,621,662; and 5,706,191, the contents of which are incorporated herein by reference.

Figure 2:
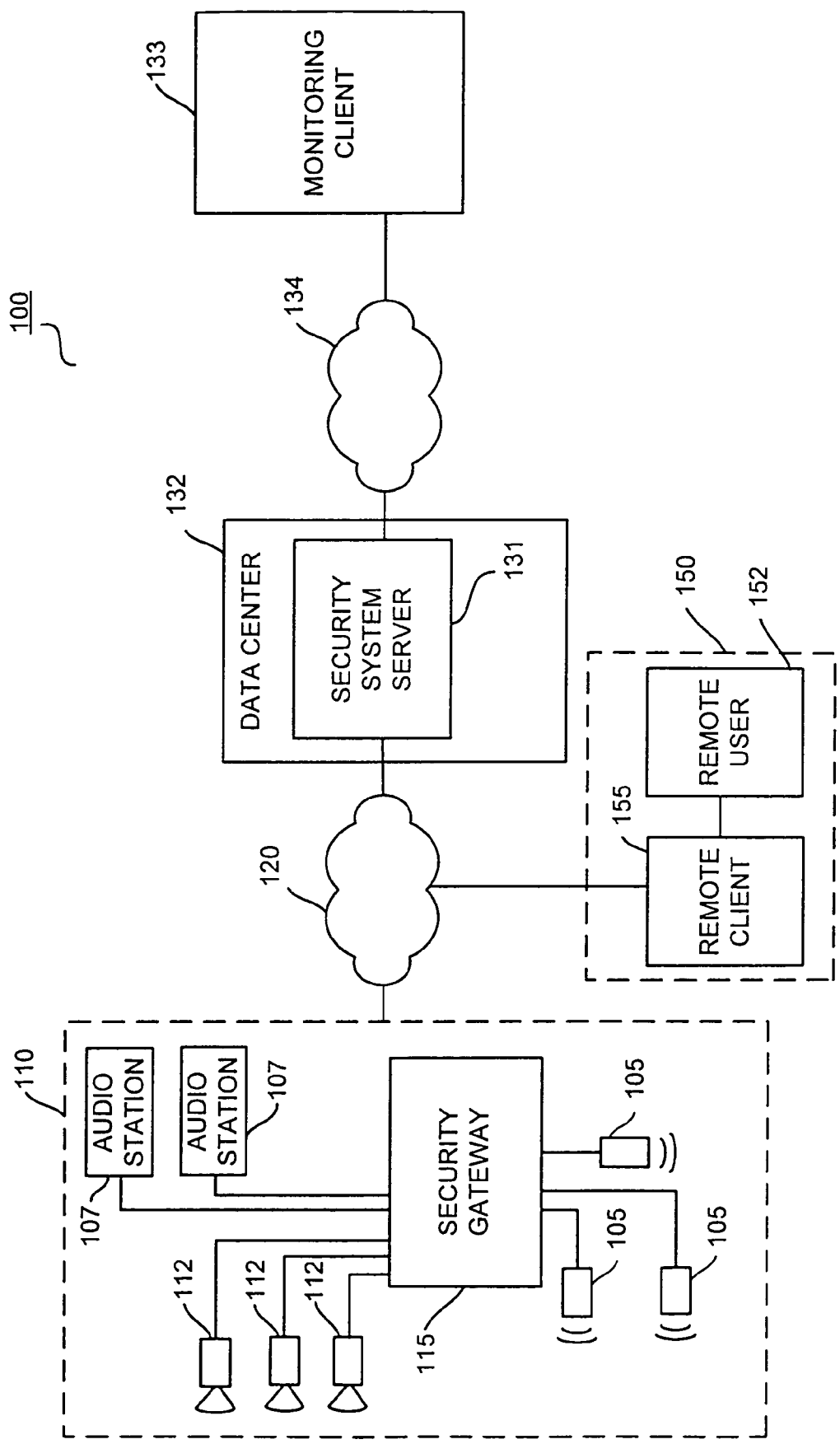
FIG. 2 is a block diagram of a security system according to an alternative embodiment of the disclosed system and method.

Reference is now made to FIG. 2, which depicts a block diagram of the system 100 of FIG. 1, according to an alternative embodiment of the present invention. As shown, security gateway 115 is operatively coupled to data center 132 through network 120, which is, in turn, operatively coupled to a monitoring client 133 through network 134.

Data center 132 stores customer information including billing information and security system settings, and is generally configured to automate certain aspects of security system 100. Data center 132 receives audio and video from security gateway 115 and sends it in real-time to monitoring client 133. Data center 132 authenticates remote user 152 of remote client 155, recognizes multiple alarm notifications, and monitors the various components of security gateway 115. Technology-intensive equipment including the security system server 131 may be kept in the data center 132 where physical access may be strictly controlled. Advantageously, in this configuration, non-technical personnel may be kept away from the sophisticated and expensive equipment in the data center 132, and the non-security-related personnel would not have direct access to view sensitive alarm notifications and videos. Any alarm notification and audiovisual information sent by security gateway 115 is transmitted to the security system server 131 at the data center 132. The security system server 131 logs the alarm notification and retrieves information about the customer, which may include, without limitation, any prior alarm notifications or events. The security system server 131 also transmits the alarm notification and audiovisual information, along with any additional information, to one or more monitoring clients 133, where such information and video may be displayed for a monitoring operator to determine if an alarm condition exists.

In the illustrative embodiment, communications among security gateway 115, data center 132, and monitoring client 133 may occur through public and/or private networks. In particular, security gateway 115 is coupled to data center 132, which is coupled to monitoring clients 133 through network 134. Although network 134 is logically depicted as a single network, it will be appreciated by one skilled in the art that network 134 may comprise a plurality of data networks that may or may not be homogeneous. In one embodiment, at least some of the monitoring clients 133 may be coupled to the security system server 131 through the Internet. In other embodiments, monitoring clients 133 may be coupled to the security system server 131 through dedicated connections such as a frame relay connection or ATM connection. Advantageously, maintaining dedicated lines between security gateway 115 and security system server 131 and between security system server 131 and monitoring client 133 provides a secure connection from security gateway 115 to monitoring client 133 that may have dedicated bandwidth and/or low latency. Network 134 includes all such networks and connections. In another embodiment, not shown, data center 132 may be coupled to monitoring clients 133 through network 120.

Figure 3:
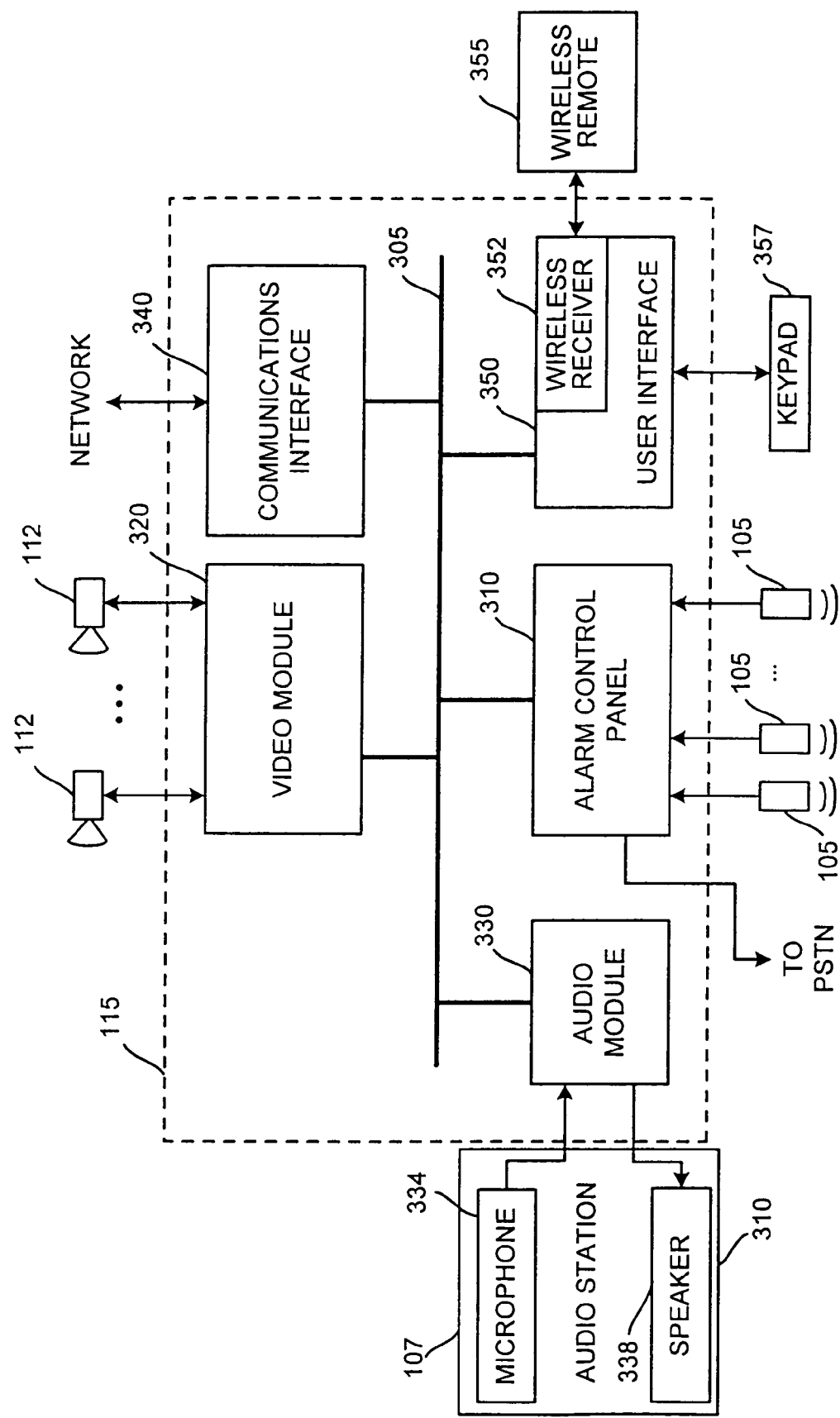
FIG. 3 is a block diagram of a security gateway according to one embodiment of the disclosed system and method.

Reference is now made to FIG. 3, which illustrates an exemplary embodiment of the security gateway 115 of FIG. 1 for use in monitoring the premises 110. As shown in FIG. 3, security gateway 115 may include an alarm control panel 310, a video module 320, a user interface 350, a communications interface 340, and an audio module 330. As shown in FIG. 3, the components of security gateway 115 are configured to communicate with one another through system bus 305. In other embodiments, some or all of the components may be directly connected or otherwise operatively coupled to one another.

Alarm control panel 310 interfaces with one or more sensors 105, which may be wired or wireless. In some embodiments, it may include an interface to the Public Switched Telephone Network (PSTN) or a cellular network. However, as shown, the interface to the PSTN may be contained in the communications interface 340 instead of the alarm control panel 310. The alarm control panel 310 is preferably capable of operation in isolation as per UL requirements for residential fire applications and residential burglary operations. Alarm control panel 310 is further capable of continuing to operate in the traditional manner regardless of the state of the video subsystem.

Alarm control panel 310 may be configured to communicate with the other components of the security system to monitor their operational state. Information that the alarm control panel 310 may receive includes, but is not limited to, whether security gateway 115 can communicate with the security system server through the communications interface 340, information about AC power failure, trouble by zone, fire trouble, telephone line trouble, low battery, bell output trouble, loss of internal clock, tamper by zone, fail to communicate, module fault, camera trouble, and intercom trouble. The detected operational failure of any component in security gateway 115 may be indicated by a communications loss between components and a concurrent alarm condition reported by alarm control panel 310 and displayed for the user on user interface 350 or announced through audio module 330. In addition, any detected operation failures may be communicated to the security system server 131 through communications interface 340. Alarm control panel 310 may also be configured to record alarm conditions and associated data in memory. The security system server 131 may also be configured to record alarm conditions and associated data in addition to or in lieu of alarm control panel 310 doing so. In some embodiments, alarm control panel 310 supports dialup access by authorized users to remotely configure the system. However, the preferred mode of configuration is through an Internet web site. In other embodiments, other components of security gateway 115 may be configured to perform this function. For example, in one embodiment, video module 320 records alarm conditions and the associated data.

Video module 320 may perform many functions including but not limited to analyzing data from one or more of the sensors 105 or cameras 112 to determine whether an alarm condition exists; accessing data stored in memory; generating alarm video to transmit to security system server 131 in response to detection of an alarm condition; and communicating with security system server 131 and remote client 155 through communications interface 340. In addition, video module 320 may buffer video from cameras 112 in memory. Then, based on predefined criteria, older video that is not considered essential to any alarm signals may be discarded. Video module 320 may also be configured to record video, or portions thereof, on a predetermined basis, which may correspond, for example, to the requirements of the customer. Non-alarm video may be stored for later retrieval by the customer. In one embodiment, the customer or remote user at remote location 150 may be able to adjust the predetermined basis including, without limitation, adjusting the recording times, duration, and total length of the recordings. In some embodiments, non-alarm video may also be sent to the security system server 131 for storage. Video module 320 is also capable of streaming live audio and video from the residence during alarm conditions, pre-alarm events, post-alarm events, and non-alarm events, as well as for lifestyle monitoring. If a camera 112 is analog, video module 320 may digitize the video before transmitting it. When security system 100 is armed, audio and video data are constantly being stored in the video module's memory for potential use as pre-event media In one particular embodiment, video module 320 contains sufficient memory to store sixty seconds of pre-alarm video and audio from each camera 112 and microphone 334 at audio station 107 in RAM and up to several hours of audio/video content (per camera 112 and audio station 107) on disk. When an alarm condition occurs, this cached data may be stored more permanently. The General Administrator of a security system 100 may delete recorded information, archive non-alarm information, and adjust the cache length. A guest user may only make such changes if the General Administrator has assigned such permissions and access to the guest user.

Audio module 330 controls audio stations 107, which typically include an audio transmitter, such as one or more speakers 338, and an audio receiver, such as one or more microphones 334. In a typical configuration, several microphones 334 and speakers 338 would be located throughout premises 110. The audio signals detected by microphone(s) 334 are recorded through audio module 330. Audio module 330 may record the audio or it may transmit the audio to video module 320 for storage. Audio module 330 may be capable of selecting an individual audio input 334 or any combination of audio inputs 334. Further, audio module 330 may play back audio signals through speaker(s) 338. Audio module 330 may provide gain control for microphones 334 and volume control for speakers 338 in audio station 332.

Communications interface 340 may serve as the gateway between security gateway 115 and one or more communications networks such as a Hybrid Fiber Coaxial Network (HFC) plant, PSTN 145, WAN, LAN, and wireless networks. Communications interface 340 may comprise software and hardware including, but not limited to a network interface card. In some embodiments, communications interface 340 may be physically separate from the other components of security gateway 115. Regardless of its form, communications interface 340 assists in the communication of data to and from security gateway 115 and security system server 131.

In addition, security gateway 115 may include a web-enabled user interface 350. User interface 350 may further include a display device, such as a computer screen, television or keypad, for displaying information to the user. Such information may include, without limitation, the current system status, whether an alarm condition has been detected, and whether any components have failed. In addition, other non-system-related information such as the time, date, weather forecasts, and news bulletins may be displayed. In the illustrative embodiment, user interface 350 is operatively coupled to a keypad 357. A user could thereby activate or deactivate the security system by entering a predetermined code on keypad 357. It will be understood with the benefit of this disclosure by those of skill in the art that other types of user interfaces 350 may be used with this invention. For example, security gateway 115 may be activated or deactivated with a remote portable transmitter 355. Wireless remote 355 communicates with user interface 350 via wireless receiver 352. Additional receivers may be used with the present invention to pick up weak signals. Security gateway 115 is further capable of responding to wireless remotes 355 for changing alarm states of the security system. Each wireless remote 355 may comprise, for example, a key fob, which may be identified to security gateway 115 as a unique user.

In some embodiments of the present invention, two-way audio communications may be initiated between a remote user 152 and the premises 110 through audio module 330. The monitoring station personnel cannot initiate lifestyle functions. To address privacy concerns, monitoring personnel have access to the security system components only during alarm events. Advantageously, the two-way audio communication allows the remote user 152 to interact with a person at the premises without the need for the person at the premises to acknowledge communications channels.

In order to address privacy concerns, in accordance with a preferred embodiment of the present invention, an audio or visual indicator may be included to notify occupants at the premises that they are under remote surveillance. While streaming live media for lifestyle monitoring or any other remote connection is made with the security system 100, security gateway 115 activates a notification signal such as an audible or visible "splash tone" on a frequent basis. For purposes of the present invention, the term "splash tone" is used broadly to mean an audio cue or visual cue, or both, to indicate to one or more persons at the premises that remote surveillance and monitoring of the premises 110 is occurring.

The notification signal may include a unique tone, bell, or other manufactured sound. The notification signal may be a unique tone which repeats periodically. The notification signal may also include audible signals such as speech and other messages that announce the identity of the remote user 152. The notification signal may further comprise a unique message when remote monitoring begins, such as "[Grannie] has established a connection." The notification signal may further comprise a signal to indicate when remote surveillance has ended, such as "[Grannie] has disconnected."

The notification signal may also include a visual cue, such as an LED located a keypad or on the appropriate camera(s) 112. The notification signal may also include visual data for indicating the identity of the remote user 152. For example, a graphical image, a depiction of the user, or an alphanumeric message may be used to identify the remote user 152. Therefore, the notification signal may be unique depending on the identity of the remote user 152.

In one embodiment, the security system may include one or more "smart cameras" that have much of the functionality of the Video Module 320 built in Specifically, these smart cameras may be operable to perform video capture, compression and storage and to communicate with the security gateway using a home area network, e.g., a wireless standard such as the home networking standard 802.11b, or powerline. In essence, the smart camera would function as a network appliance that is able to receive instructions from the security gateway to control the session, FPS (frames per second), quality, bandwidth, support other supervised communication from the gateway, and to transmit video and other information to the security gateway. Preferably, transmission between the camera and security gateway 115 should be secure and reliable, even taking into account the relatively noisy household environment. Optionally, the smart camera is operable to detect motion in the recorded image and send an event signal to the security gateway. The camera may integrate other sensor functionality such as audio discrimination and analysis and motion detection.

Figure 4:
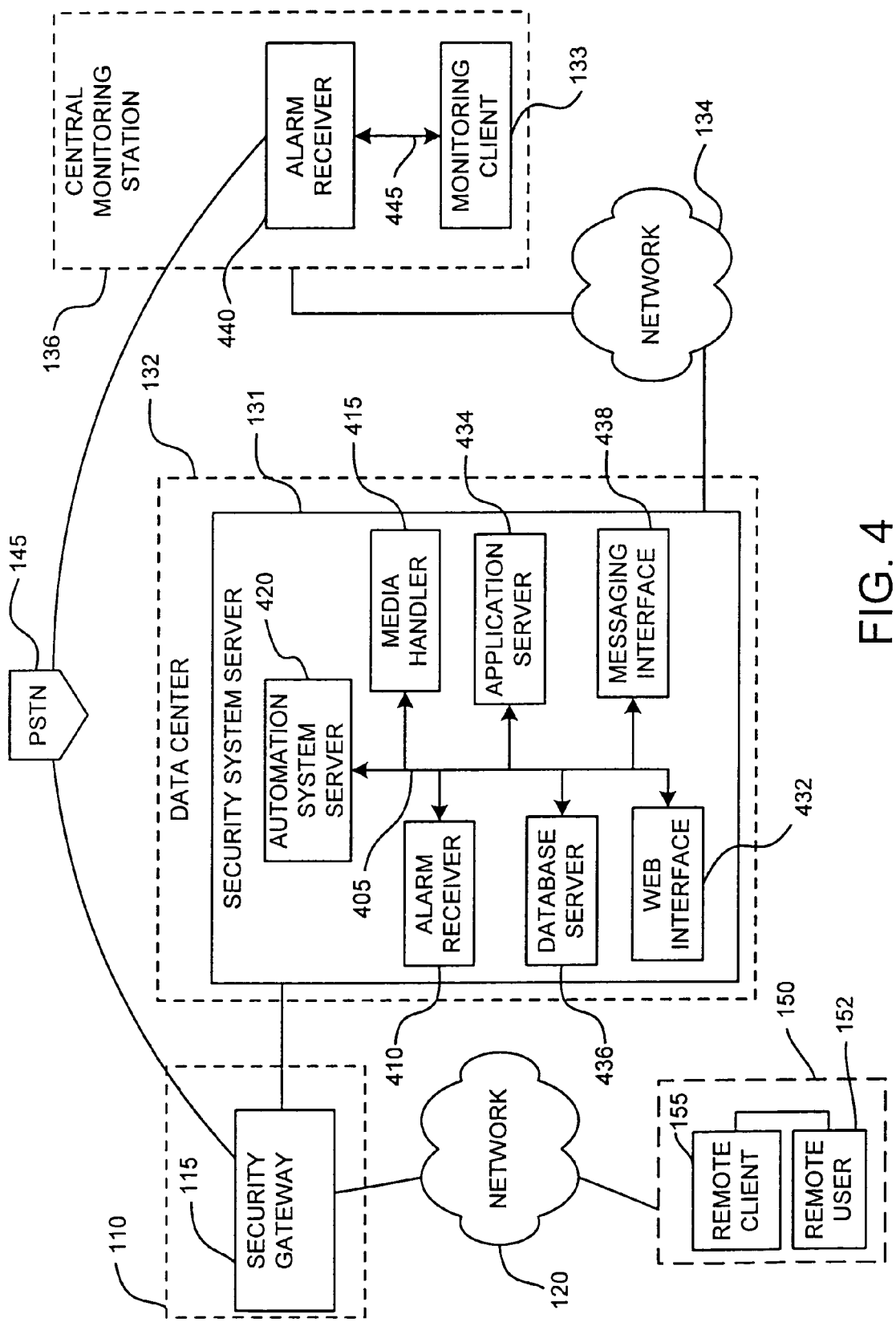
FIG. 4 is a more detailed block diagram of a security system according to one embodiment of the disclosed system and method.

Reference is now made to FIG. 4, which depicts a more detailed illustration of the various components of the security system server 131 of FIG. 1 and a central monitoring station 136, according to one embodiment of the present invention. These components may be software programs executable on processor-based devices operable to communicate with one another through LAN 405 and LAN 445, respectively. In one particular embodiment, these components are processor-based devices operating under the Microsoft® Windows NT™ operating system. However, it is understood that the present invention is not limited to the illustrated configuration. For example, the components may be implemented as software running on one or more computing devices. Alternatively, the components may be implemented in several devices that may be directly connected via communications interfaces (e.g., serial, parallel, IEEE 1394, IR, RF or USB).

Central monitoring station (CMS) 136 is a facility operatively coupled to data center 132 and security gateway 115. Any alarm notification and audiovisual information sent by the security gateway 115 is transmitted to central monitoring station to determine if an alarm condition exists. If an alarm condition exists, CMS 136 personnel can contact the appropriate authorities, etc. In this configuration, a concentration of trained personnel handle systems located throughput the country. In most embodiments, the communication channel between the data center 132 and central monitoring station 136 is secure, and accordingly, an unencrypted protocol may be used. In one particular embodiment, an unencrypted ASCII protocol over a TCP/IP connection may be used. In configurations where the connection between the security system server 131 and monitoring client(s) 133 is not secure, it may be desirable to use an encrypted protocol.

Monitoring client 133 resides in central monitoring station 136 and is operable to display video and images transmitted from security gateway 115 in real-time, as well as provide two-way communication between monitoring client 133 and security gateway 115. In the present disclosure, the term "real-time" is intended to generally mean that no substantive time period elapses between the captured audiovisual data and the receipt of audiovisual data corresponding to the event by monitoring client 133.

As shown, security system server 131 may comprise alarm receiver 410, media handler 415, automation system server 420, web interface 432, application server 434, database server 436, and messaging interface 438.

Alarm receiver 410 receives the alarm notification and associated information from security gateway 115. The alarm event is then logged and recorded by automation system server 420. Alarm events can also be reported by security gateway 115 to alarm receiver 440 via a communications network such as PSTN 145. Alarm receiver 440 posts the alarm condition to automation system server 420. Monitoring client 133 retrieves audio and video data from media handler 415. In one particular embodiment, the monitoring client 133 retrieves the audio and video data from media handler 415 using Microsoft® ActiveX. In other embodiments, other media handling/communications protocols may be used, including, without limitation, custom protocols. The communications protocol is used to transmit audio and video content from media handler 415, submit control messages (for selecting cameras, microphones, and speakers during live feeds), and support Voice Over IP (VoIP), streaming audio, and video services between the residence and monitoring client 133 during an alarm condition.

Automation system server 420 is generally configured to store customer data, for example contact information, billing information, passwords, as well as alarm history. Alternatively, some or all of this information may be stored in monitoring client 133 or at another remote site. Since this data is usually low bandwidth, dedicated bandwidth may not be necessary. However, it may be desirable for security purposes for it to remain in data center 132. Automation system server 420 may also serve as a workflow system for operators responding to alarm conditions, as well as a log of all monitoring activity. In an exemplary embodiment, automation system server 420 is a database application based on, for example Microsoft SQL Server 7, running under Windows NT. CMS personnel may interface with automation system server 420 over the network via a client application, which may be built into monitoring client 133.

Media handler 415 is generally operable to provide several functions. For example, media handler 415 receives and stores video and audio data associated with alarm conditions from security gateway 115 and relays alarm condition data, for example audio and video, to monitoring client 133. Media handler 415 may also be responsible for keeping track of the network addresses for all the security gateways 115 that are attached. For example, media handler 415 relays alarm conditions reported via TCP/IP from security gateway 115 to automation system server 420. Media handler 415 may also provide access to audio and video associated with alarm conditions to authorized personnel for a predetermined time period after an alarm condition is detected. Additionally, media handler 415 may relay control and configuration data destined for security gateways 115. This data may originate either from an operator (located at central monitoring station 136) through monitoring client 133 or from remote user 152 at remote location 150.

The communications protocol between monitoring client 133 and media handler 415 may be proprietary and/or may use standard protocols. The communications protocol between security gateway 115 and media handler 415 may provide secondary pathways for transmitting alarm notifications, relays configuration information to security gateway 115 (including control messages for arming and disarming partitions, bypassing zones, and selecting cameras 112 and audio stations 107 for live feeds), uploading pre-event and relevant non-alarm audio and video to media handler 415 during an alarm condition, transmitting live video and audio during an alarm condition, supporting voice over IP (VOIP) services between the residence and monitoring client 133 during an alarm condition, and performing software updates.

Web interface 432 provides authorized remote users 152 with the ability to view and edit account information, arm and disarm security system 100, and view and hear live and recorded media from premises 110, all through a network-based interface. In many embodiments, this network-based interface is an Internet web site, or a portion of a web site. After the remote user 152 is authenticated, application server 434 provides and/or facilitates the features available to remote client 155 through web interface 432. The particular features that are made available are a design decision that may vary based upon several factors, which may include, without limitation, the permissions of the remote user 152 and the type of premises that is monitored.

Messaging interface 438 may also provide for transmission of a message to remote client 155 by page, phone, e-mail, interactive voice response, short message service, or other messaging tool. Such a message will serve to notify multiple contacts on the alarm contact list when an alarm event has taken place or is taking place.

In one embodiment, a three-tier architecture may be used to provide such an interface. The first tier may consist of web servers running Internet Information Server (IIS) on Windows NT™, which is responsible for static web content such as images. Requests for dynamic content may be forwarded to application server 434. Application server 434 generally provides or facilitates all of the functionality that is accessible to remote clients 155. The third tier is a database tier that may be provided by automation system server 420. Data storage may be, for example, a billing database. Authorized users may receive information from the database regarding their account by accessing database server 436. Application server 434 may access automation system server 420 to obtain account information and issue commands ultimately destined for security gateway 115.

After remote client 152 is authenticated, application server 434 may be configured to allow remote client 152 to view audiovisual content from security gateway 115, communicate with automation system server 420 to access customer data, and access features of the security system 100. In one embodiment, such features may include, without limitation, arming or disarming security system 100; adjusting sensitivities of sensors 105 (if present); adjusting alarm condition detection sensitivity; remote monitoring; adjusting camera 112 settings and audio station 107 settings; adjusting settings for lights, HVAC (heating, ventilation, and air conditioning) systems, irrigation systems and other environmental controls; and reviewing alarms and recordings. In particular, application server 434 may allow remote user 152 to access media directly from security gateway 115. In one embodiment, a live feed from the premises is available with the ability to select among cameras 112 and microphones 334. In some embodiments, only video from certain specified cameras is accessible for remote clients. In some embodiments, application server 434 may be configured to allow remote user 152 to initiate a two-way audio connection with the security gateway 115 so that the remote user 152 can communicate through the audio stations 332 via speaker(s) 338 and microphone(s) 334 attached to security gateway 115. Communication between application server 434 and automation system server 420 may take the form of calls to stored procedures defined in the master database maintained by automation system server 420.

Access to web interface 432 requires successful authentication using any technique discussed above, such as entering a username and password. Preferably, all account-specific web content, including the login request, employs the secure HTTP protocol. In one embodiment, each customer may be assigned a General Administrator (GA) account. GA accounts have full access to their respective associated security gateway 115. The GA account can also create a number of guest user ("remote user" 152) accounts that have limited access (as discussed above) to their respective associated security gateway 115. Typically, all account information is stored through automation system server 420, including usernames and passwords. Web interface 432 retrieves account data from automation system server 420 for display via the Web, by means of one or more stored procedures. The GA can modify a subset of this account data and update the corresponding entries in automation system server 420.

Figure 5:
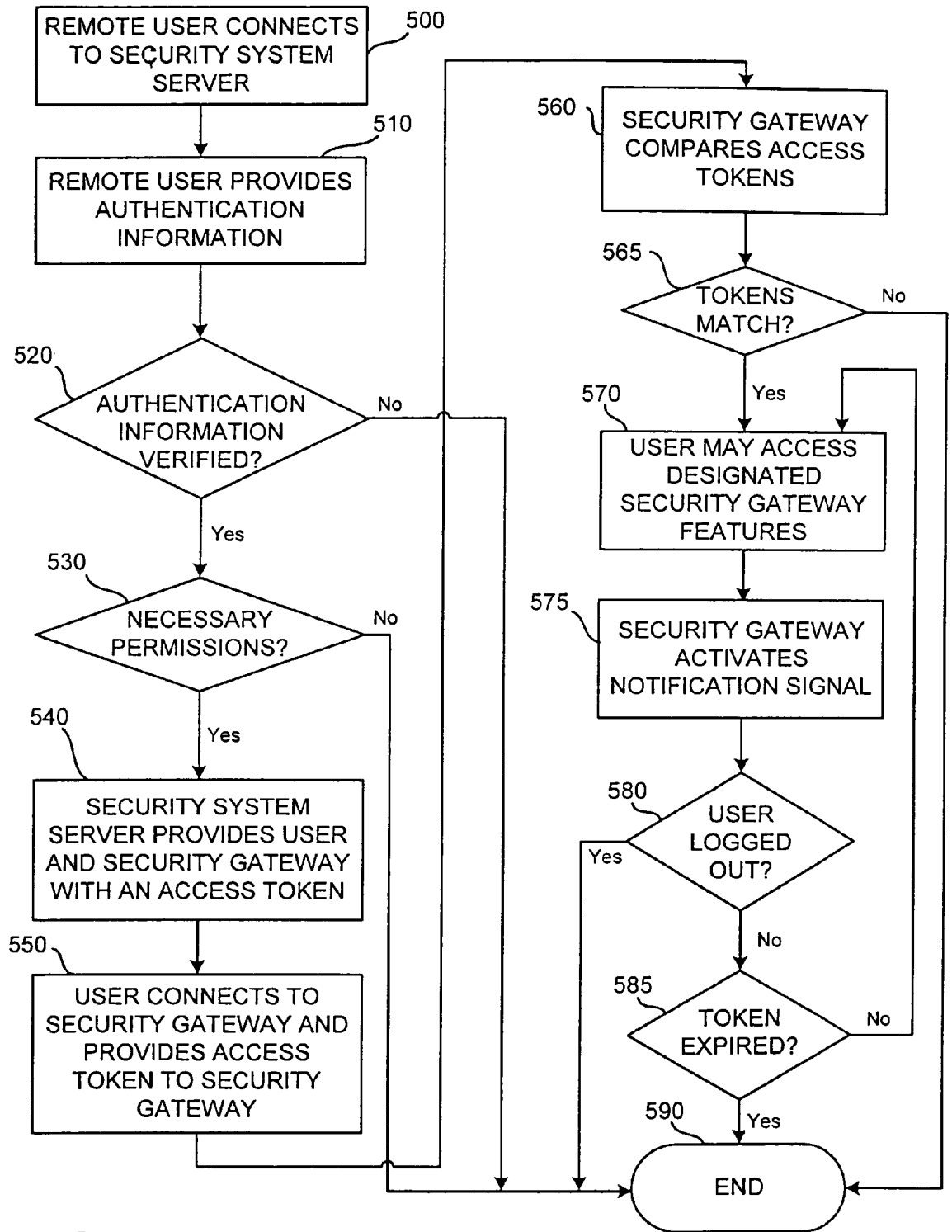
FIG. 5 is a process flow diagram depicting the process flow for a remote user at a remote location accessing a security system according to one embodiment of the disclosed system and method.

Referring now to FIG. 5, a process flow diagram is shown illustrating the process for remote monitoring of a premises by a remote user using a remote client located at a remote location using a security system such as the security system 100 of FIGS. 1–2. In particular, remote users may access features of a security gateway such as the security gateway 110 of FIG. 3. These features include without limitation viewing and editing account information, arming and disarming the security system, and accessing live and recorded audiovisual data from the premises.

In step 500, the remote user connects to a security system server. In an exemplary embodiment, the remote user may connect to the security system server using a web browser such as Netscape Navigator or Microsoft® Internet Explorer. In other embodiments, the remote user may connect to the security system server via an interactive television platform having a friendly and easy-to-navigate user interface.

In step 510, the remote user provides the security system server with information for authentication. The type of information used for authentication may take many forms. For example, in one embodiment, a media handler associated with the security system server may require some sort of a username and password combination. Further, it is to be understood by the disclosure of one of skill in the art that any other procedure suitable for authenticating the identity of the remote user may be used, such as by validating the remote user's biometric data.

The security system server verifies the authentication information in step 520. If the information is not authenticated, then the remote user is denied access to the features of the security gateway, and process flow ends in step 590. Precautions against unauthorized access may be implemented, including, but not limited to, logging incidents of access attempts, with emphasis on denied access.

In step 530, the security system server determines if the remote user has the necessary permissions to access the security gateway. Necessary permissions may include access to a particular camera or a particular audio station located at the premises, access during a particular time period, access to audio and or video information, and access to change passwords, settings and/or activate and deactivate the security system. If the remote user does not have the necessary permissions, the remote user is denied access to the security system, and process flow ends in step 590.

If the remote user has the necessary permissions, in step 540, the security system server provides the remote client and the security gateway with an access token. The access token will typically comprise the identity of the remote user, the identity of security gateway to be accessed, the access permissions to be granted for the access token, and the desired lifespan of the token, as well as a digital signature of the security system server. It is noted that in accordance with the present invention, the remote user is only allowed access to those features corresponding to the permissions associated with the remote user's permissions profile. For instance, the remote user may only have permission to access a camera in a baby's nursery, and may lack access to the other cameras in the premises. Alternatively, if the remote user is the General Administrator of the security gateway, then he or she has full access to the security gateway features.

The remote client then connects directly to the security gateway and provides the security gateway with the access token in step 550. It is noted that the term "connects directly" means that communications between the remote client and security gateway do not pass through security system server. The security gateway inspects the access token received from the remote client and compares it to the access token received by the security gateway in step 560. If the access tokens do not match, then the remote user at the remote client is denied access to the security gateway, and process flow ends in step 590.

If the access tokens match in step 565, then the remote user may access features of the security gateway in step 570 in accordance with the user's permissions profile. During access by the remote user of the security system cameras or audio stations at the premises, the security gateway activates a notification signal comprising an audiovisual cue at the premises in step 575, indicating to occupants of the premises that remote monitoring is occurring. For example, an LED on a camera at the premises may be activated while the remote user is accessing that camera. In another example, an audible tone may be activated while the remote user is accessing an audio station at the premises. The remote user will continue to be able to access designated security gateway features until the remote user logs out according to step 580 or the access token expires according to step 585.

In some embodiments, the security system server may assign a lifespan to the access token. In such cases, after a pre-specified time or event, the access token expires and the remote user may not access the security gateway after the expiration of the access token. In order to access to the features of the security gateway after expiration of the access token, the remote user must reconnect to the security system server and provide valid authentication information.

Accordingly, the remote user may then connect directly to security gateway to perform remote monitoring through security gateway, check the system status, initiate a two-way audio conference, and/or any other features made available by security gateway and falling within the remote user's permissions. In some embodiments, only remote monitoring and two-way audio conferencing is made available through security gateway. In these embodiments, all non-media features are provided through security system server.

The remote monitoring feature allows remote user to view all or portions of the video signal from video cameras and to hear all or portions audio information from audio stations. Depending on the bandwidth of the connection, the video may be of a lower quality than that transmitted to central monitoring station for verification of alarm signals in order to save bandwidth. For example, in one embodiment, the video transmitted to remote user may have a lower frame rate, lower resolution, and/or lower color depth. Depending on the remote user's permissions and the remote client's capabilities, the remote user may be able to configure the quality of the video for remote monitoring.

In addition, depending on the remote user's level of permissions, the remote user may access remote features of the security gateway directly to reconfigure the security system. Once authenticated, the remote user may reconfigure some or all of the features of the security gateway. These features may include, without limitation, arming or disarming the security system; adjusting sensitivities of sensors (if present); adjusting alarm condition detection sensitivity; remote monitoring; adjusting camera and audio station settings; and reviewing alarms and recordings. Camera settings may include without limitation pan, tilt, focus, brightness, contrast and zoom.

The present invention also overcomes similar problems with personal emergency response systems (PERS) and telemedicine, including telehealth. The monitoring clients in these applications can now use the video and alarm to better diagnose the problem. In many ways, alarms from health sensors, emergency panic buttons and the like are similar to alarm sensors in terms of generating false and unwanted alarms. This system also enables health care givers and concerned family members to use the remote client feature for increased peace of mind.

The foregoing examples are included to demonstrate embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

The invention claimed is:

1. A method for remote monitoring of a premises, said method comprising:
   operatively coupling a remote client to a security system server, said security system server being capable of authenticating a user of said remote client;
   operatively coupling said remote client to a security gateway, said security gateway being capable of managing the monitoring of one or more portions of said premises;
   said operative coupling of said remote client to said security gateway further comprises:

said security system server verifying the identity of said user of said remote client;

transmitting authorization information from said security system server to said remote client and from said security system server to said security gateway, said authorization information transmitted to said remote client including access permissions for said user;

said remote client using said authorization information received thereby to initiate operative coupling with said security gateway;

said security gateway using said authorization information received from said security system server and said authorization information received from said remote client to complete operative coupling between said security gateway and said remote client;

said security system server initiating generation of a signal at said premises for notifying an occupant at said premises that remote monitoring is occurring; and transferring information between said security gateway and said remote client;

wherein said security gateway generates said signal whenever said security gateway is transferring information to said remote client;

wherein said user is at a location which is geographically remote from said premises;

wherein access to said security gateway by said remote client is allowed based upon said access permissions for said user;

wherein said access permissions for said user are based upon a permission profile created by a general administrator of said security gateway; and wherein said authorization information expires at a designated time and date.

2. A method for remote monitoring of a premises, said method comprising:

operatively coupling a remote client to a security system server, said security system server being capable of authenticating a user of said remote client;

operatively coupling said remote client to a security gateway, said security gateway being capable of managing the monitoring of one or more portions of said premises;

said operative coupling of said remote client to said security gateway further comprising:

said security system server verifying the identity of said user of said remote client;

transmitting authorization information from said security system server to said remote client and from said security system server to said security gateway, said authorization information transmitted to said remote client including access permissions for said user;

said remote client using said authorization information received thereby to initiate operative coupling with said security gateway;

said security gateway using said authorization information received from said security system server and said authorization information received from said remote client to complete operative coupling between said security gateway and said remote client;

said security system server initiating generation of a signal at said premises for notifying an occupant at said premises that remote monitoring is occurring; and transferring information between said security gateway and said remote client;

wherein said security gateway generates said signal whenever said security gateway is transferring information to said remote client;

wherein said user is at a location which is geographically remote from said premises;

wherein access to said security gateway by said remote client is allowed based upon said access permissions for said user;

wherein said access permissions for said user are based upon a permission profile created by a general administrator of said security gateway; and wherein said authorization information expires after a designated length of time has elapsed.

3. A method for remote monitoring of a premises, said method comprising:

operatively coupling a remote client to a security system server, said security system server being capable of authenticating a user of said remote client;

operatively coupling said remote client to a security gateway, said security gateway being capable of managing the monitoring of one or more portions of said premises;

said operative coupling of said remote client to said security gateway further comprising:

said security system server verifying the identity of said user of said remote client;

transmitting authorization information from said security system server to said remote client and from said security system server to said security gateway, said authorization information transmitted to said remote client including access permissions for said user;

said remote client using said authorization information received thereby to initiate operative coupling with said security gateway;

said security gateway using said authorization information received from said security system server and said authorization information received from said remote client to complete operative coupling between said security gateway and said remote client;

said security system server initiating generation of a signal at said premises for notifying an occupant at said premises that remote monitoring is occurring; and transferring information between said security gateway and said remote client;

wherein said security gateway generates said signal whenever said security gateway is transferring information to said remote client;

wherein said user is at a location which is geographically remote from said premises;

wherein access to said security gateway by said remote client is allowed based upon said access permissions for said user;

wherein said access permissions for said user are based upon a permission profile created by a general administrator of said security gateway; and wherein said authorization information expires after a designated number of access have occurred.

4. A method for remote monitoring of a premises, said method comprising:

operatively coupling a remote client to a security system server, said security system server being capable of authenticating a user of said remote client;

upon authentication of said user of said remote client, said security system server transmitting, to said remote client, authorization information necessary for said remote client to access a security gateway for said premises;

said remote client transmitting, to said security gateway, said authorization information transmitted to said remote client by said security system server;

operatively coupling said remote client to said security gateway, said security gateway being capable of managing the monitoring of one or more portions of said premises; and transferring information between said security gateway and said remote client;

wherein operatively coupling said remote client to said security gateway further comprises:

said remote client using said authorization information received thereby to initiate operative coupling with said security gateway; and said security gateway using said authorization information received from said security system server and said authorization information received from said remote client to complete operative coupling between said security gateway and said remote client;

wherein said user is at a location which is geographically remote from said premises;

wherein said remote client cannot access said security gateway: (1) without said authorization information transmitted to said remote client by said security system server, or (2) after expiration of said authorization information transmitted to said remote client by said security system server; and wherein said authorization information which enables said remote client to access said security gateway is configured to have a lifespan which expires independently of said remote client initiating or terminating an access of said security gateway.

5. The method of claim 4 wherein said lifespan of said authorization information is time-based.

6. The method of claim 5, wherein said time-based lifespan of said authorization information expires at a designated time and date subsequent to said security system server transmitting said authorization information to said remote client.

7. The method of claim 6, wherein said authorization information is an access token.

8. The method of claim 5, wherein said time-based lifespan of said authorization information expires after a designated length of time has elapsed subsequent to said security system server transmitting said authorization information to said remote client.

9. The method of claim 8, wherein said authorization information is an access token.

10. The method of claim 5, wherein said authorization information is an access token.

11. The method of claim 4, wherein said authorization information is an access token.

12. The method of claim 4 and further comprising activating a signal at said premises for notifying an occupant at said premises that remote monitoring is occurring.

13. A method for remote monitoring of a premises, said method comprising:

operatively coupling a remote client to a security system server, said security system server being capable of authenticating a user of said remote client;

upon authentication of said user of said remote client, said security system server transmitting, to said remote client, authorization information necessary for said remote client to access a security gateway for said premises;

said remote client transmitting, to said security gateway, said authorization information transmitted to said remote client by said security system server;

operatively coupling said remote client to said security gateway, said security gateway being capable of managing the monitoring of one or more portions of said premises; and transferring information between said security gateway and said remote client;

wherein operatively coupling said remote client to said security gateway further comprises:

said remote client using said authorization information received thereby to initiate operative coupling with said security gateway; and said security gateway using said authorization information received from said security system server and said authorization information received from said remote client to complete operative coupling between said security gateway and said remote client;

wherein said user is at a location which is geographically remote from said premises; and wherein said remote client cannot access said security gateway: (1) without said authorization information transmitted to said remote client by said security system server, or (2) after expiration of said authorization information transmitted to said remote client by said security system server.

14. The method of claim 13, wherein said authorization information is an access token.

15. The method of claim 13 and further comprising activating a signal at said premises for notifying an occupant at said premises that remote monitoring is occurring.

16. A method for remote monitoring of a premises, said method comprising:

operatively coupling a remote client to a security system server, said security system server being capable of authenticating a user of said remote client;

operatively coupling said remote client to a security gateway, said security gateway being capable of managing the monitoring of one or more portions of said premises;

said security system server verifying the identity of said user of said remote client;

transmitting an access token from said security system server to said remote client; and providing said security gateway with information about said user and said access token;

transferring information between said remote client and said security gateway;

wherein operatively coupling said remote client to said security gateway further comprises:

said remote client using said access token received thereby to initiate operative coupling with said security gateway; and said security gateway using said information about said user and said access token received from said security system server and said access token received from said remote client to complete operative coupling between said security gateway and said remote client;

wherein said access token is adapted to allow said remote client to access said security gateway based on a permission profile for said user;

wherein said permission profile for said user is created by a general administrator of said security gateway; and wherein said access token has a lifespan which expires independently of said remote client initiating or terminating an access of said security gateway.

17. The method of claim 16, wherein said lifespan of said access token is time-based.

18. The method of claim 16, wherein said time-based lifespan of said access token expires at a designated time and date.

19. The method of claim 16, wherein said time-based lifespan of said access token expires after a designated length of time has elapsed.

20. The method of claim 16 and further comprising activating a signal at said premises for notifying an occupant at said premises that remote monitoring is occurring.

* * * * *